US010828804B2

(12) United States Patent
Dark (10) Patent No.: US 10,828,804 B2
(45) Date of Patent: *Nov. 10, 2020

(54) MOLDING SYSTEM WITH REMOVEABLE INSERTS RESTRAINED AGAINST VERTICAL MOVEMENT

(71) Applicant: The Boeing Company, Chicago, IL (US)

(72) Inventor: Stephen R. Dark, Seattle, WA (US)

(73) Assignee: The Boeing Company, Chicago, IL (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/150,823

(22) Filed: Oct. 3, 2018

(65) Prior Publication Data

US 2020/0108526 A1     Apr. 9, 2020

(51) Int. Cl.
 *B29C 33/48* (2006.01)
 *B29C 43/42* (2006.01)
 *B29C 33/30* (2006.01)
 *B29C 43/36* (2006.01)

(52) U.S. Cl.
 CPC .......... *B29C 33/48* (2013.01); *B29C 33/306* (2013.01); *B29C 33/485* (2013.01); *B29C 43/42* (2013.01); *B29C 2043/3665* (2013.01)

(58) Field of Classification Search
 CPC ....... B29C 33/48; B29C 43/42; B29C 33/485; B29C 2043/425; B29C 33/306
 See application file for complete search history.

(56) References Cited

U.S. PATENT DOCUMENTS

| 1,733,064 | A | * | 10/1929 | Lambert | ................. B29C 33/48 425/37 |
| 5,178,885 | A | * | 1/1993 | Vallier | ................ B29C 33/0038 249/160 |
| 5,802,696 | A | * | 9/1998 | Zuccarini | .............. B29C 33/301 249/142 |
| 2017/0334096 | A1 | | 11/2017 | Westberg et al. | |
| 2018/0056554 | A1 | * | 3/2018 | Gaw | ........................ B29C 33/48 425/37 |
| 2020/0108525 | A1 | * | 4/2020 | Dark | ...................... B29C 70/46 |

* cited by examiner

*Primary Examiner* — Xiao S Zhao
*Assistant Examiner* — John J Derusso
(74) *Attorney, Agent, or Firm* — Yee & Associates, P.C.

(57) ABSTRACT

A molding system for forming a composite structure having trapped volumes is presented. The molding system comprises a plurality of removeable inserts, a bottom tool member, and a plurality of restraints. Each removeable insert of the plurality of removeable inserts comprises a plurality of pieces configured to be disassembled for removal from the composite structure. Each removeable insert is configured to be placed in contact with the bottom tool member. The plurality of restraints is configured to restrain the plurality of removeable inserts in a vertical direction relative to the bottom tool member.

20 Claims, 9 Drawing Sheets

MOLDING SYSTEM WITH REMOVEABLE INSERTS RESTRAINED AGAINST VERTICAL MOVEMENT

BACKGROUND INFORMATION

1. Field

The present disclosure relates generally to molding systems, and more specifically, to molding systems for forming structures with trapped volumes. Yet more specifically, the present disclosure relates to providing a molding system with removeable inserts for forming a composite structure with trapped volumes.

2. Background

Compression molding is a widely used manufacturing process utilizing pressure and sometimes heat to mold thermoplastic or thermoset materials into a desired shape. As shapes of resulting compression molded products become more complex, compression molding of the products becomes more difficult.

For example, as shapes of resulting compression molded products become more complex, removing the products from the compression mold becomes more difficult. Some compression molded components with curved or angled walls may include cavities with complex shapes. Cavities with complex shapes may deter removal of tooling from the cavities. These cavities may also be referred to as trapped volumes, and tooling within these cavities may be referred to as trapped tooling.

As another example, as shapes of resulting compression molded products become more complex, achieving desirable quality for the products may become more difficult. For some compression molded products, tolerances for thickness, angle, or spacing of product walls may be difficult to achieve with conventional molds. Therefore, it would be desirable to have a method and apparatus that takes into account at least some of the issues discussed above, as well as other possible issues. For example, it would be desirable to provide compression molding tooling that can be removed from trapped volumes of products while providing desired quality of the product.

SUMMARY

An illustrative example of the present disclosure provides a molding system for forming a composite structure having trapped volumes. The molding system comprises a plurality of removeable inserts, a bottom tool member, and a plurality of restraints. Each removeable insert of the plurality of removeable inserts comprises a plurality of pieces configured to be disassembled for removal from the composite structure. Each removeable insert is configured to be placed in contact with the bottom tool member. The plurality of restraints is configured to restrain the plurality of removeable inserts in a vertical direction relative to the bottom tool member.

Another illustrative example of the present disclosure provides a molding system for forming a composite structure having trapped volumes. The molding system comprises a plurality of removeable inserts and a bottom tool member. Each removeable insert of the plurality of removeable inserts comprises a plurality of pieces configured to be disassembled for removal from the composite structure. Each removeable insert of the plurality of removeable inserts is configured to interface with a restraint. Each removeable insert is configured to be placed in contact with the bottom tool member.

Another illustrative example of the present disclosure provides a method of forming a composite structure using a molding system. A plurality of removeable inserts is placed against a bottom tool member of the molding system, each removeable insert of the plurality of removeable inserts comprising a plurality of pieces. The plurality of removeable inserts is restrained against vertical movement relative to the bottom tool member of the molding system. The composite structure is formed in the molding system. A removeable insert of the plurality of removeable inserts is released from the bottom tool member. The removeable insert is removed through a cavity in the composite structure by disassembling the removeable insert and removing each piece of the removeable insert through the cavity.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that there are several different types of components with curved, angled, or otherwise shaped walls that create cavities with complex shapes. Cavities with complex shapes may deter removal of tooling from the cavities.

The illustrative examples recognize and take into account that composite materials are tough, light-weight materials created by combining two or more functional components. A composite material includes reinforcing fibers bound in polymer resin matrix. The fibers may be unidirectional or may take the form of a woven cloth or fabric. Composite materials include at least one of thermoplastic materials or thermoset materials.

The illustrative examples recognize and take into account that airplanes with jet engines are often equipped with thrust reversers that increase drag on the airplane during landings, thereby reducing the speed of the aircraft. The illustrative examples recognize and take into account that a thrust reverser increases drag by effectively reversing the flow of exhaust gases through the jet engine. In one type of thrust reverse, referred to as a cascade-type, a transcowl on the jet engine nacelle translates rearwardly to expose a cascade formed by multiple open grid panels. Closing of a blocker door causes a bypass portion of the airflow through the engine to be diverted through a series of circumferentially arranged cascade vanes in the grid panels which are oriented to redirect the airflow forwardly and thereby produce reverse thrust.

The illustrative examples recognize and take into account that in cascades, the vanes, which provide the forward turning, and the strongbacks, which provide the side turning, have both curved and straight sections. The illustrative examples recognize and take into account that the curved sections are on the inner side and the straight sections are on the outer side. The illustrative examples recognize and take into account that the geometry of traditional cascades makes removing a simple mold insert from the passages created by the vanes and strongbacks of the cascade impossible or undesirably difficult.

The illustrative examples recognize and take into account that the passages created by the vanes and strongbacks may be referred to as cavities or trapped volumes. The illustrative examples recognize and take into account that there are different approaches for removing mold inserts, including dissolvable inserts, expandable inserts, and inserts with interconnected pieces.

The illustrative examples recognize and take into account that one way of compression molding thermoplastic material into a one piece cascade utilizes molds with hundreds of removeable inserts, each removeable insert formed of several smaller interconnected pieces. The illustrative examples recognize and take into account that using a mold with hundreds of inserts involves accurate placement of each of the hundreds of removeable inserts. The illustrative examples recognize and take into account that using a mold with hundreds of inserts has a large assembly time, and large disassembly time.

The illustrative examples further recognize and take into account that vane wall thickness for a cascade has a small tolerance. The illustrative examples recognize and take into account that greater than basic material shrinkage may result in an undesirable amount of variation in vane wall thickness. The illustrative examples recognize and take into account that tooling design, including design of the inserts may contribute to variation in vane wall thickness. The illustrative examples also recognize and take into account that assembly of the mold tool, including the removeable inserts may contribute to the variation in vane wall thickness.

The illustrative examples recognize and take into account that in compression molding with removeable inserts, a molded product, also called a structure, is associated with the periphery of the plurality of removeable inserts. More specifically, cavities of the structure are formed by the peripheries of the inserts.

During compression molding, a material is compressed around the periphery of an insert to form the compression molded product. When a plurality of inserts is present, the compression molded product is formed between the plurality of inserts as well as between the plurality of inserts and the remainder of the mold.

The illustrative examples recognize and take into account that adding components to a molding tool may also undesirably increase the time and labor to assemble and disassemble the tool. For example, increasing a quantity of removeable inserts may undesirably increase at least one of the amount of time or amount of labor for assembly and disassembly of the molding tool.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustrative examples recognize and take into account that insert movement during compression molding may be undesirable. The illustrative examples recognize and take into account that insert movement during either of compression periods or dwell periods of the compression molding process may be undesirable. The illustrative examples recognize and take into account that conventional tools, to reduce assembly and disassembly time, provide inserts having an interference fit to hold the inserts in place relative to the remainder of the mold.

The illustrative examples also recognize and take into account that adding components to a molding tool may also undesirably increase the cost of the tool. For example, when additional components are used in a molding tool, the additional components create an added cost for the molding tool. The illustrative examples further recognize and take into account that adding components to a molding tool may also increase the complexity of the molding tool.

The illustrative examples provide a molding system configured to form a composite structure having trapped volumes and a desired quality. The molding system comprises a plurality of restraints configured to restrain a plurality of removeable inserts against vertical movement relative to a bottom tool member. By restraining the plurality of removeable inserts against movement relative to the bottom tool member, the composite structure is formed within desired tolerances.

Figure 1:
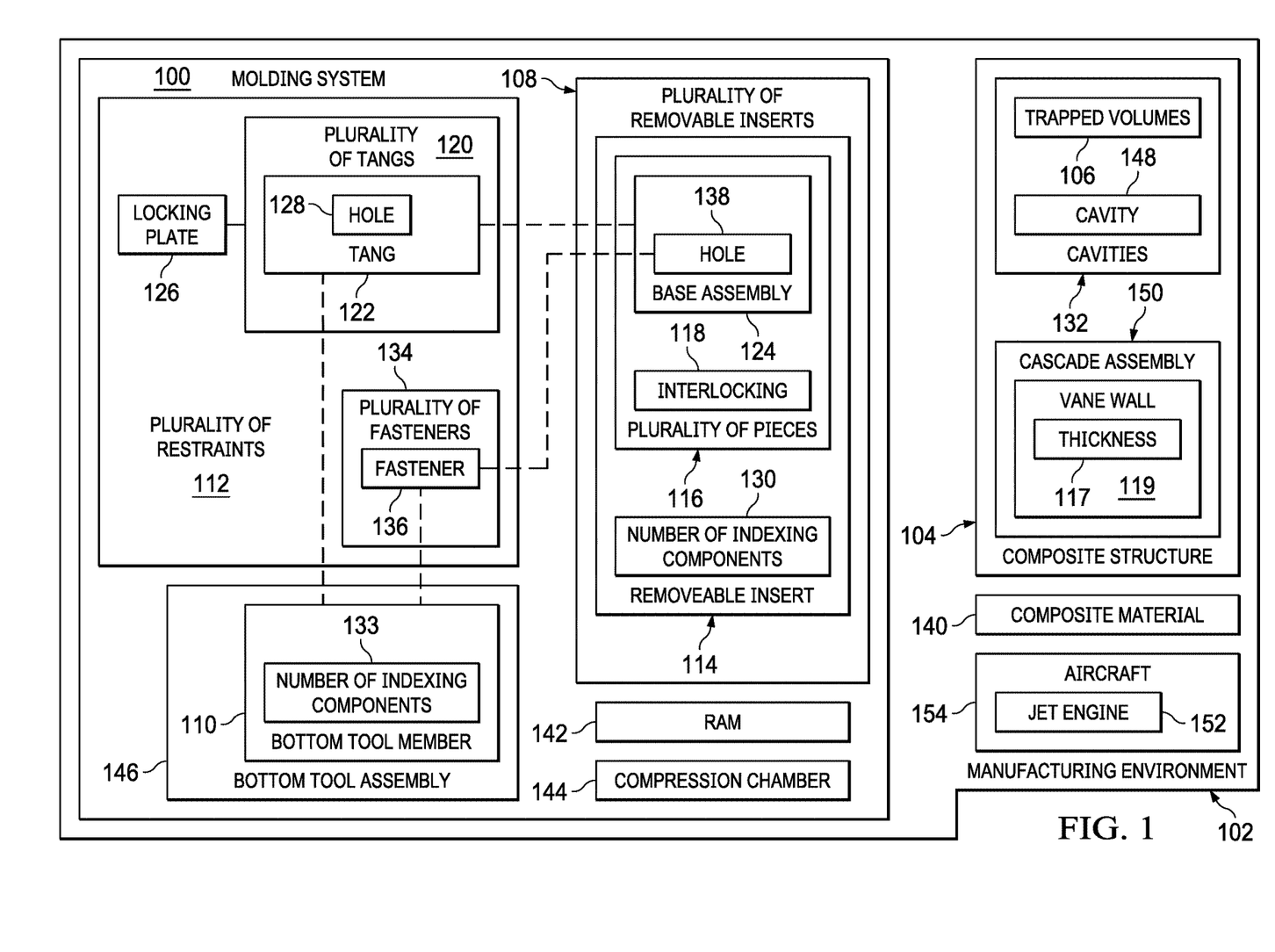
FIG. 1 is an illustration of a block diagram of a manufacturing environment in which a molding system operates in accordance with an illustrative example.

Turning now to FIG. 1, an illustration of a block diagram of a manufacturing environment in which a molding system operates is depicted in accordance with an illustrative example. Molding system 100 in manufacturing environment 102 is configured to form composite structure 104 having trapped volumes 106. The design of molding system 100 provides for compression molding to form composite structure 104 with a desirable quality.

Molding system 100 comprises plurality of removeable inserts 108, bottom tool member 110, and plurality of restraints 112. Plurality of removeable inserts 108 in molding system 100 is configured to form trapped volumes 106 with composite structure 104. Each removeable insert of plurality of removeable inserts 108 comprises a plurality of pieces configured to be disassembled for removal from composite structure 104. For example, removeable insert 114 comprises plurality of pieces 116 configured to be disassembled for removal from composite structure 104.

Plurality of pieces 116 is interlocking 118 to form removeable insert 114. In an assembled configuration, plurality of pieces 116 is joined together to form removeable insert 114.

After assembling removeable insert 114, removeable insert 114 is positioned relative to other components of molding system 100. In an assembled configuration, removeable insert 114 is indexed to bottom tool member 110. Each removeable insert of plurality of removeable inserts 108 is configured to be placed in contact with bottom tool member 110.

Bottom tool member 110 may also be referred to as a bottom tool plate, or a base plate. If plurality of removeable inserts 108 moved during compression molding, the quality of composite structure 104 would be impacted.

For example, in some examples, if a removeable insert of plurality of removeable inserts 108 was to move during compression molding, thickness 117 of vane wall 119 would be impacted. In one illustrative example, if a removeable insert of plurality of removeable inserts 108 was to move during compression molding, thickness 117 of vane wall 119 would be outside of acceptable tolerances.

In some examples, movement of plurality of removeable inserts 108 during compression molding undesirably affects part fill during molding. In some examples, undesirable part fill due to movement of plurality of removeable inserts 108 could cause part occlusions. In illustrative examples, movement of plurality of removeable inserts 108 during compression molding creates resin starved areas, undesirably affecting part strength.

In molding system 100, removeable inserts 108 are restrained against undesirable movement relative to bottom tool member 110. Plurality of restraints 112 is used to restrain plurality of removeable inserts 108 against movement relative to bottom tool member 110 in a number of directions. As used herein, "a number of" items means one or more items. For example, "a number of directions" is one or more directions. When molding system 100 is assembled, plurality of restraints 112 is physically associated with plurality of removeable inserts 108.

A first component may be considered to be physically associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of and/or an extension of the second component.

Plurality of restraints 112 is configured to restrain plurality of removeable inserts 108 in a vertical direction relative to bottom tool member 110. In some illustrative examples, plurality of restraints 112 restrains plurality of removeable inserts 108 in a plurality of directions.

Plurality of restraints 112 takes any desirable form. In some illustrative examples, plurality of restraints 112 comprises plurality of tangs 120, each of plurality of tangs 120 physically associated with a respective removeable insert of the plurality of removeable inserts. For example, tang 122 of plurality of tangs 120 is physically associated with to removeable insert 114 of plurality of removeable inserts 108.

In some illustrative examples, each removeable insert of plurality of removeable inserts 108 comprises a respective base assembly. The respective base assembly is one of the plurality of pieces of the respective removeable insert. For example, removeable insert 114 comprises base assembly 124. Base assembly 124 is one of plurality of pieces 116 forming removeable insert 114. Any desirable quantity of plurality of pieces 116 may nest, interconnect, or otherwise interact with base assembly 124. In these illustrative examples, base assembly 124 may contact bottom tool member 110 when removeable insert 114 is placed in contact with bottom tool member 110.

In some illustrative examples, each of plurality of tangs 120 is physically associated with a respective base assembly of a respective removeable insert of plurality of removeable inserts 108. For example, when plurality of restraints 112 comprises plurality of tangs 120, tang 122 is physically associated with base assembly 124 of removeable insert 114.

When plurality of restraints 112 comprises plurality of tangs 120, plurality of restraints 112 further comprises locking plate 126 in contact with each of plurality of tangs 120 to restrain plurality of removeable inserts 108 relative to bottom tool member 110. In some illustrative examples, locking plate 126 interacts with a respective hole of each tang of plurality of tangs 120. For example, to restrain removeable insert 114 relative to bottom tool member 110, locking plate 126 may interact with hole 128 of tang 122.

In some illustrative examples, plurality of tangs 120 is inserted into bottom tool member 110. Plurality of tangs 120 may be inserted into and extend through bottom tool member 110 to interact with locking plate 126.

During assembly, locking plate 126 is placed beneath bottom tool member 110 to intersect each insert of plurality of removeable inserts 108. Plurality of tangs 120 is locked into place by locking plate 126 when slid into molding system 100. In some illustrative examples, locking plate 126 is automated with rack and pinion to automate release of plurality of removeable inserts 108 during mold opening cycle.

In some illustrative examples, when plurality of tangs 120 extends through bottom tool member 110, plurality of tangs 120 may be used as indexing components for plurality of removeable inserts 108. For example, when tang 122 is inserted into bottom tool member 110, tang 122 may be used as one of number of indexing components 130 of removeable insert 114. Number of indexing components 130 is configured to position removeable insert 114 on bottom tool member 110. In some illustrative examples, number of indexing components 130 may have more than one indexing component. For example, removeable insert 114 may also have a number of pins or a number of indentations. In these illustrative examples, at least one of a number of pins or a number of indentations may work together with tang 122 to position removeable insert 114 relative to bottom tool member 110. Accuracy of placement of plurality of removeable inserts 108 impacts the placement of features, including cavities 132, within composite structure 104.

In some illustrative examples, each removeable insert of plurality of removeable inserts 108 comprises a number of indexing components configured to position the removeable insert on bottom tool member 110. In some illustrative examples, bottom tool member 110 has number of indexing components 133 configured to interface with indexing components of plurality of removeable inserts 108. Number of indexing components 133 take any desirable form. Number of indexing components 133 may take the form of holes, indentations, pins, protrusions, or any other type of physical indexing structure.

In some illustrative examples, plurality of restraints 112 comprises plurality of fasteners 134. Plurality of fasteners 134 takes the form of any desirable type of fastener such as bolts, screws, or any other desirable type of fastener. In some illustrative examples, plurality of fasteners 134 utilizes commonly available manufacturing fasteners, such as ¼-20 fasteners, to reduce cost. Plurality of fasteners 134 is used at each insert of plurality removeable inserts 108 to hold each removeable insert to bottom tool member 110.

In some illustrative examples, each fastener of plurality of fasteners 134 extends through bottom tool member 110 and is physically associated with a respective removeable insert of plurality of removeable inserts 108. In some illustrative examples, plurality of fasteners 134 extends through bottom tool member 110 and interface with threaded holes within plurality of removeable inserts 108. For example, fastener 136 of fasteners 134 is depicted as interfacing with hole 138 in base assembly 124. In these illustrative examples, hole 138 is threaded to receive fastener 136.

In other non-depicted examples, plurality of fasteners 134 may be part of plurality of removeable inserts 108. In some non-depicted examples, plurality of fasteners 134 extends from plurality of removeable inserts 108 through bottom tool member 110 and is secured using nuts.

In some illustrative examples, a fastener, such as fastener 136, is physically associated with base assembly 124. In some of these illustrative examples, number of indexing components 130 for removeable insert 114 includes the fastener.

In some illustrative examples, each removeable insert of plurality of removeable inserts 108 comprises a number of indexing components configured to position the removeable insert on bottom tool member 110. As depicted, removeable insert 114 comprises number of indexing components 130. Number of indexing components 130 have any desirable types of fit, such as interference fit, location fit, clearance fit, or any other desirable type of fit. In some illustrative examples, number of indexing components 130 includes a respective restraint of plurality of restraints 112.

Molding system 100 is configured for forming composite structure 104 having trapped volumes 106. Molding system 100 comprises plurality of removeable inserts 108 and bottom tool member 110. Each removeable insert of plurality of removeable inserts 108 comprises plurality of pieces 116 configured to be disassembled for removal from composite structure 104. Each removeable insert of plurality of removeable inserts 108 is configured to interface with a restraint. In some illustrative examples, each removeable insert of plurality of removeable inserts 108 has a hole configured to receive a restraint. Each removeable insert is configured to be placed in contact with bottom tool member 110.

In some illustrative examples, each removeable insert of plurality of removeable inserts 108 has the hole within a respective base assembly of a respective removeable insert of plurality of removeable inserts 108. The hole is configured to receive a fastener extending through bottom tool member 110. In some illustrative examples, removeable insert 114 of plurality of removeable inserts 108 has hole 138 within base assembly 124. Hole 138 is configured to receive fastener 136 extending through bottom tool member 110.

In some illustrative examples, each removeable insert of plurality of removeable inserts 108 has the hole within a tang extending from a respective base assembly of a respective removeable insert of plurality of removeable inserts 108. In some illustrative examples, removeable insert 114 of plurality of removeable inserts 108 has hole 128 within tang 122 extending from base assembly 124.

In some illustrative examples, molding system 100 further comprises locking plate 126 in contact with each tang of plurality of removeable inserts 108 to restrain plurality of removeable inserts 108 relative to bottom tool member 110. As depicted, locking plate 126 is configured to be in contact with plurality of tangs 120 of molding system 100. Although only one locking plate 126 is depicted, any desirable quantity of locking plates may be used. In some illustrative examples, more than one locking plate may be used in molding system 100.

In some illustrative examples, plurality of tangs 120 is inserted into bottom tool member 110 to restrain plurality of removeable inserts 108. In one illustrative example, tang 122 is inserted into bottom tool member 110.

Prior to forming composite structure 104, plurality of removeable inserts 108 is positioned against bottom tool member 110 and restrained against movement relative to bottom tool member 110. Composite structure 104 is formed from composite material 140 introduced to molding system 100. At least one of pressure or heating is applied to composite material 140 in molding system.

To apply pressure, molding system 100 includes ram 142. Ram 142 is moved through compression chamber 144 towards bottom tool assembly 146 including bottom tool member 110. Ram 142 moves towards bottom tool assembly 146 to apply pressure to composite material 140. Compression chamber 144 contacts bottom tool assembly 146 to form a parting line of molding system 100. After forming composite structure 104, ram 142 and compression chamber 144 are moved away from bottom tool assembly 146 to expose a surface of composite structure 104.

Plurality of removeable inserts 108 form cavities 132 within composite structure 104. Perimeters of plurality of removeable inserts 108 form the shapes of cavities 132. For example, removeable insert 114 forms cavity 148 of cavities 132.

In some illustrative examples, composite structure 104 is cascade assembly 150 of jet engine 152 of aircraft 154. The quality of cascade assembly 150 is improved by restraining plurality of removeable inserts 108 relative to bottom tool member 110. For example, vane wall 119 has thickness 117 within a desired tolerance by restraining removeable insert 114 relative to bottom tool member 110.

Restraining plurality of removeable inserts 108 ensures consistent wall thicknesses and shape of composite structure 104 being molded. Plurality of restraints 112 provides consistent material flow of composite material 140 within molding system 100 due to reduction of movement of plurality of removeable inserts 108 during compression molding.

The illustration of manufacturing environment 102 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, additional components may be present in molding system 100, such as heating systems, movement systems for ram 142, and compression chamber 144, and other systems for application of at least one of heat or pressure within molding system 100. As another example, bottom tool assembly 146 comprises any desirable quantity of components.

Figure 2:
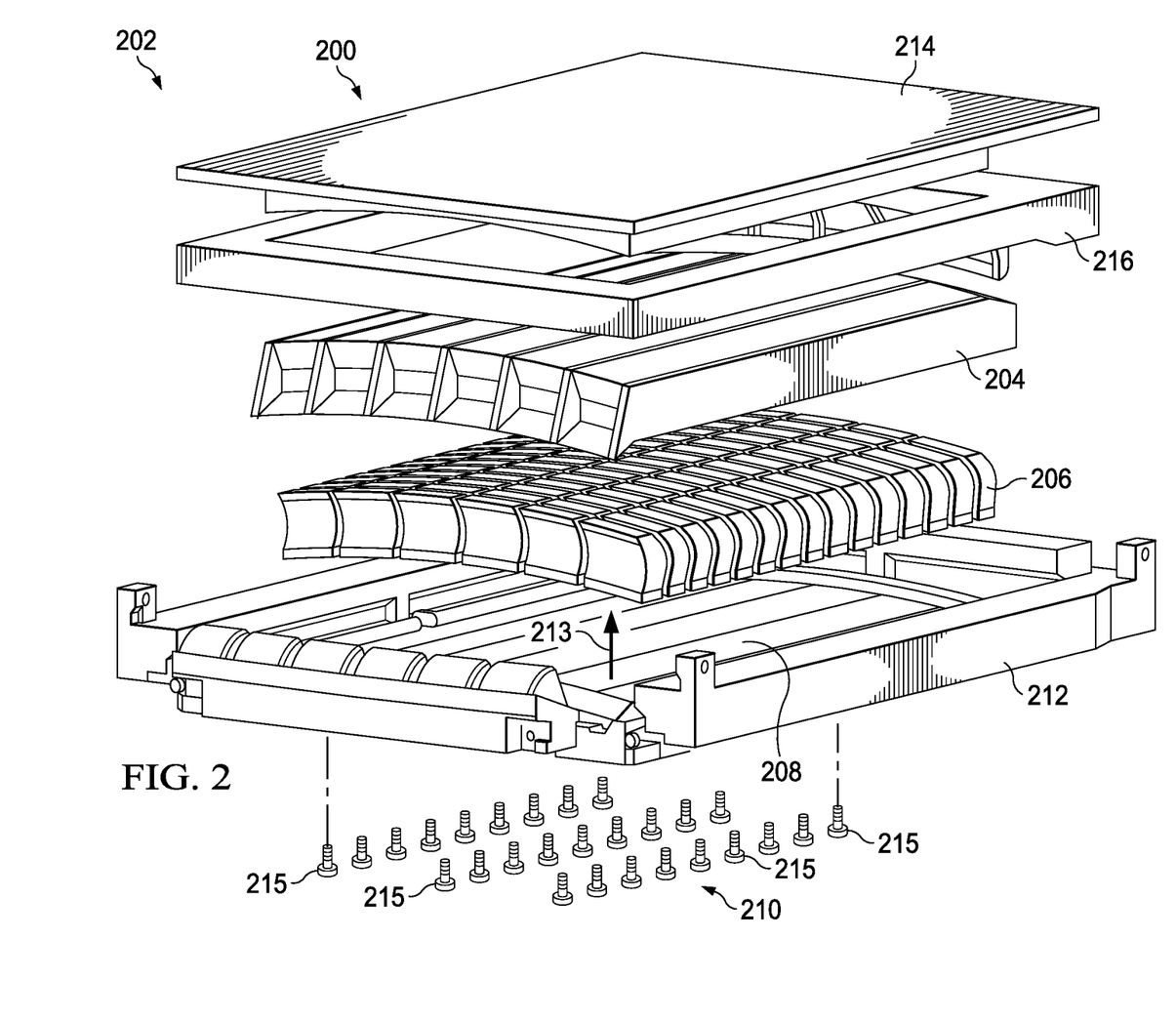
FIG. 2 is an illustration of a molding system with a plurality of removeable inserts and a molded composite structure in accordance with an illustrative example.

Turning now to FIG. 2, an illustration of a molding system with a plurality of removeable inserts and a molded composite structure is depicted in accordance with an illustrative example. Molding system 200 is a physical implementation of molding system 100 of FIG. 1. In manufacturing environment 202, composite structure 204 is formed using molding system 200. Composite structure 204 takes any desirable form. In some illustrative examples, composite structure 204 is a cascade assembly for a jet engine of an aircraft.

Molding system 200 is configured to form composite structure 204 having trapped volumes (not depicted). Molding system 200 comprises plurality of removeable inserts 206, bottom tool member 208, and plurality of restraints 210.

Each removeable insert of plurality of removeable inserts 206 comprises a plurality of pieces configured to be disassembled for removal from composite structure 204. Bottom tool member 208 is a portion of bottom tool assembly 212. In some illustrative examples, bottom tool member 208 may be referred to as a mold plate or a bottom mold plate. Each removeable insert is configured to be placed in contact with bottom tool member 208.

When molding system 200 is assembled, plurality of restraints 210 is physically associated with plurality of removeable inserts 206. Plurality of restraints 210 is configured to restrain plurality of removeable inserts 206 in vertical direction 213 relative to bottom tool member 208.

As depicted, plurality of restraints 210 takes the form of plurality of fasteners 215. Plurality of fasteners 215 is sent through bottom tool member 208 to connect to a plurality of holes (not depicted) in plurality of removeable inserts 206.

Although plurality of fasteners 215 is depicted as being inserted through bottom tool member 208, in other illustrative examples, fasteners may instead be physically associated with the plurality of removeable inserts 206. In these illustrative examples, the fasteners are components of plurality of removeable inserts 206. For example, in other non-depicted examples, a fastener may be physically associated with a respective base assembly of each removeable insert of plurality of removeable inserts 206. In these non-depicted illustrative examples, the fasteners extending from plurality of removeable inserts 206 may be used as indexing components for plurality of removeable inserts 206. In these illustrative examples, nuts or other receiving components engage the fasteners and restrain plurality of removeable inserts 206 in vertical direction 213.

As depicted, molding system 200 also comprises ram 214 and compression chamber 216. Bottom tool assembly 212 comprises any desirable quantity of connected components. Bottom tool assembly 212 is configured to contact compression chamber 216 to form a chamber for compression molding of composite material to form composite structure 204.

The illustration of molding system 200 in FIG. 2 is not meant to imply physical or architectural limitations to the manner in which an illustrative example may be implemented. Other components in addition to or in place of the ones illustrated may be used. For example, bottom tool assembly 212 may be removably secured to a base of a compression molding machine. In some illustrative examples, molding system 200 may be removably secured to a heating system.

Further, the shape, size, and quantity of plurality of removeable inserts 206 are only illustrative in FIG. 2. Plurality of removeable inserts 206 may include any desirable quantity, any desirable size, and any desirable shape of removeable inserts to create a composite structure having a desired shape.

Yet further, in some non-depicted illustrative examples, plurality of restraints 210 takes the form of another type of physical restraint other than plurality of fasteners 215. Plurality of restraints 210 takes the form of any desirable type of physical restraint. In some illustrative examples, plurality of restraints 210 takes the form of tangs on plurality of removeable inserts 206. In these illustrative examples, the tangs interact with a locking plate to restrain plurality of removeable inserts 206.

Figure 3:
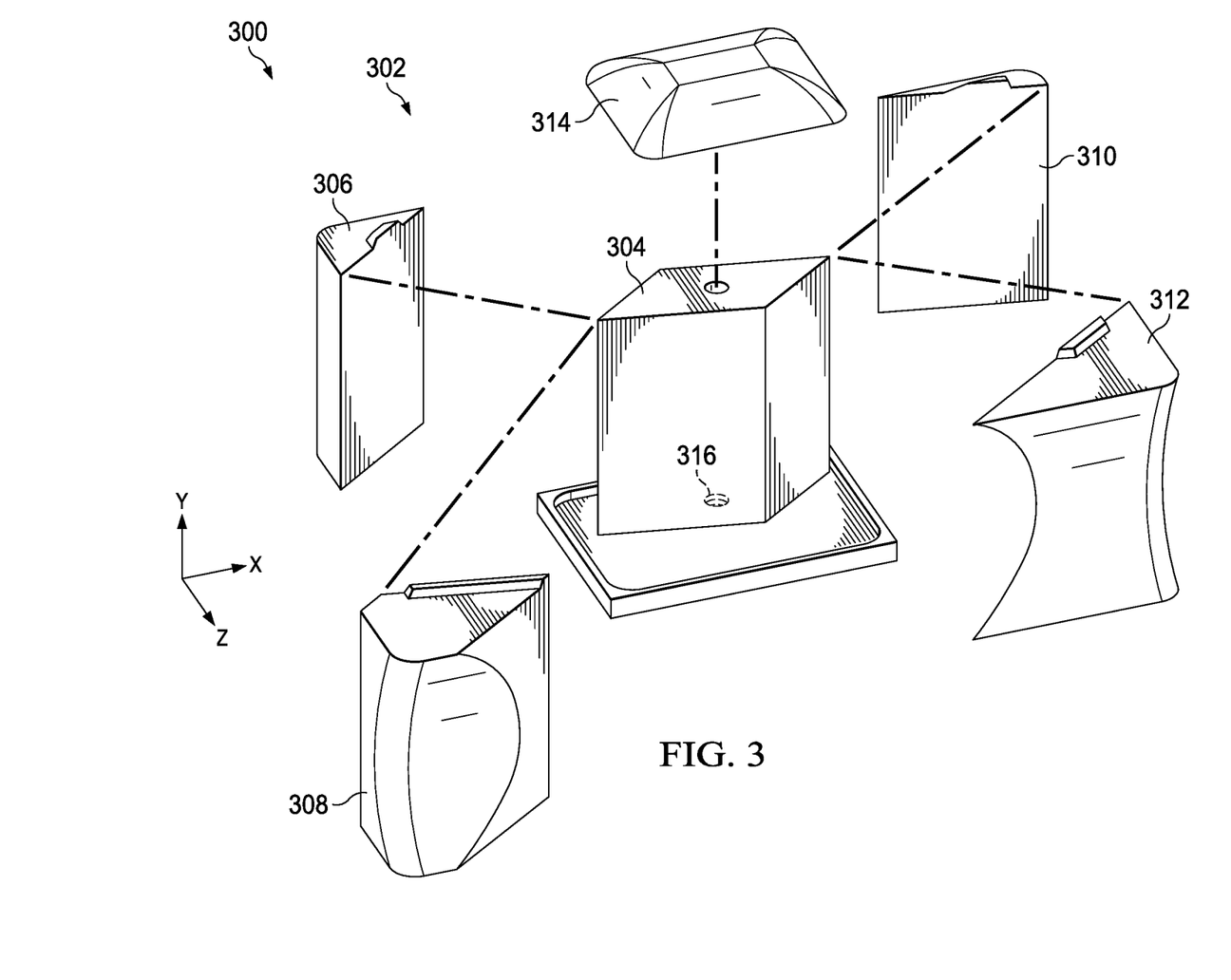
FIG. 3 is an illustration of an exploded view of a removeable insert of a molding system in accordance with an illustrative example.

Turning now to FIG. 3, an illustration of an exploded view of a removeable insert of a molding system is depicted in accordance with an illustrative example. Removeable insert 300 is a physical implementation of removeable insert 114 of FIG. 1. In some illustrative examples, removeable insert 300 is one of plurality of removeable inserts 206.

Removeable insert 300 comprises plurality of pieces 302 configured to be disassembled for removal from a composite structure. Plurality of pieces 302 comprises base assembly 304. Piece 306, piece 308, piece 310, piece 312, and piece 314 are interconnecting. In an assembled configuration (not depicted), piece 306, piece 308, piece 310, and piece 312 are in contact with base assembly 304. Piece 314 acts as a cap when removeable insert 300 is in an assembled configuration (not depicted). In an assembled configuration (not depicted), plurality of pieces 302 of removeable insert 300 is interconnected. In an assembled configuration (not depicted), plurality of pieces 302 of removeable insert 300 has restricted movement relative to each other.

In an assembled configuration (not depicted), piece 306, piece 308, piece 310, and piece 312 are seated in base assembly 304. In an assembled configuration (not depicted), piece 314 is connected to each of piece 306, piece 308, piece 310, and piece 312.

To form a structure using compression molding, removeable insert 300 is installed in a molding system, such as molding system 100 of FIG. 1, in an assembled configuration. After molding a composite structure, such as composite structure 104, using removeable insert 300, removeable insert 300 may be disassembled and removed, piece by piece, from a cavity in the composite structure.

Removeable insert 300 is configured to be restrained against vertical movement relative to a bottom tool member (not depicted). To restrain removeable insert in a vertical direction relative to a bottom tool member, a restraint is physically associated with the removeable insert. As depicted, removeable insert 300 has hole 316 configured to receive a restraint. Hole 316 is within base assembly 304 of removeable insert 300. Hole 316 is configured to receive a fastener extending through a bottom tool member. As depicted, hole 316 is a threaded hole.

The illustration of removeable insert 300 in FIG. 3 is not meant to imply physical or architectural limitations to the manner in which an illustrative example may be implemented. Removeable insert 300 is only one exemplary insert for illustrative purposes. Removeable insert 300 may include any desirable quantity of pieces and desirable shape of pieces to form a composite structure having a desired shape. Removeable insert 300 may include any desirable quantity of pieces and desirable shape of pieces to enable removal of removeable insert 300 from a cavity of the composite structure after the compression molding operation. Removeable insert 300 is comprised of any desirable material including at least one of a metallic material, a ceramic material, or any other suitable material selected to operate desirably within a compression molding operation.

Figure 4:
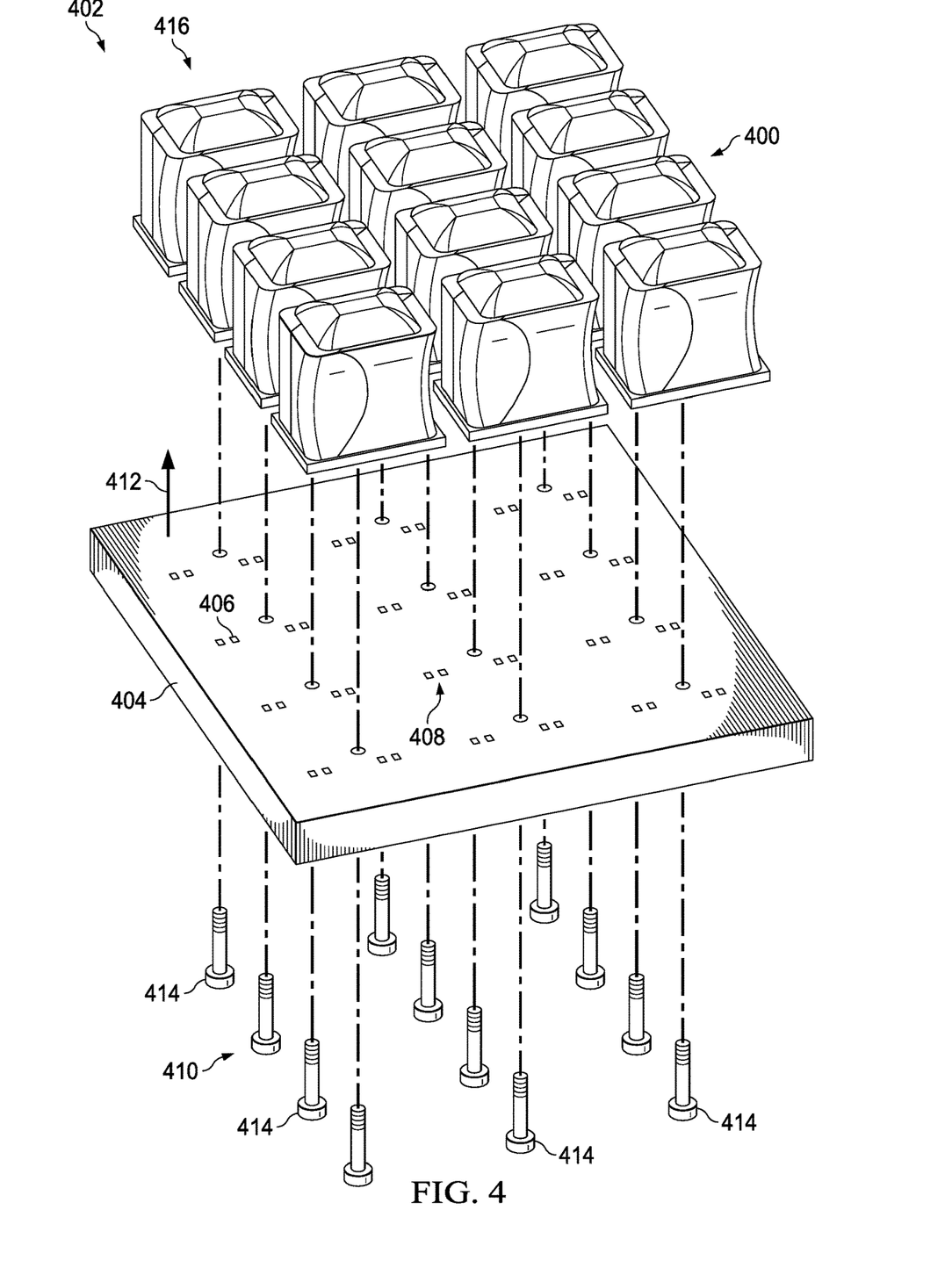
FIG. 4 is an illustration of an exploded view of a plurality of removeable inserts and a bottom tool member of a molding system in accordance with an illustrative example.

Turning now to FIG. 4, an illustration of an exploded view of a plurality of removeable inserts and a bottom tool member of a molding system is depicted in accordance with an illustrative example. Plurality of removeable inserts 400 is a physical implementation of plurality of removeable inserts 108 of FIG. 1. In some illustrative examples, plurality of removeable inserts 400 is a subset of plurality of removeable inserts 206 of FIG. 2. In some illustrative examples, removeable insert 300 of FIG. 3 is one of plurality of removeable inserts 400.

View 402 is an exploded view of plurality of removeable inserts 400 in an assembled configuration above bottom tool member 404. Bottom tool member 404 has indexing components 406 taking the form of indentations 408. Further, each of plurality of removeable inserts 400 has a number of indexing components (not depicted) to interact with indexing components 406 of bottom tool member 404. In this illustrative example, each of plurality of removeable inserts 400 may have two pins (not depicted) configured to interact with a pair of indentations of indentations 408. In other non-depicted examples, only one pin is present on each of plurality of removeable inserts 400.

Plurality of restraints 410 is configured to restrain plurality of removeable inserts 400 in vertical direction 412 relative to bottom tool member 404. When assembled, plurality of restraints 410 is physically associated with plurality of removeable inserts 400.

Each removeable insert of plurality of removeable inserts 400 is configured to interface with a restraint. Each removeable insert of plurality of removeable inserts 400 has a hole configured to receive a restraint of plurality of restraints 410. As depicted, plurality of restraints 410 takes the form of plurality of fasteners 414.

In this illustrative example, each removeable insert of plurality of removeable inserts 400 has the hole within a respective base assembly of a respective removeable insert of plurality of removeable inserts 400. The hole in the respective base assembly is configured to receive a fastener extending through bottom tool member 404. For example, each removeable insert of plurality of removeable inserts 400 has a hole in the respective base assembly to receive a fastener of plurality of fasteners 414.

The illustration of molding system 416 in FIG. 4 is not meant to imply physical or architectural limitations to the manner in which an illustrative example may be implemented. Other components in addition to or in place of the ones illustrated may be used. For example, the shape, size, and quantity of plurality of removeable inserts 400 are only illustrative in FIG. 4.

Figure 5:
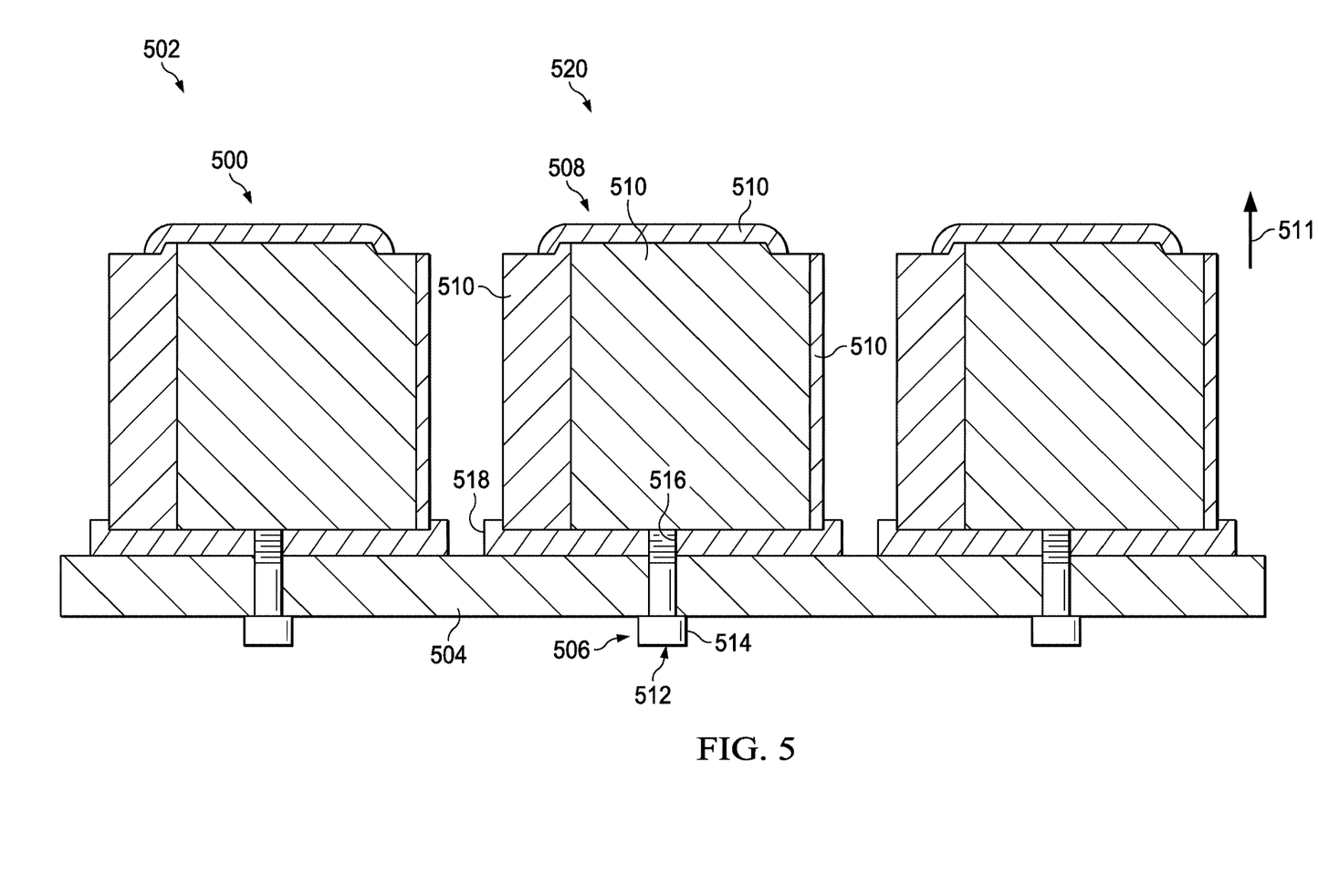
FIG. 5 is an illustration of a cross-sectional view of a plurality of removeable inserts and a bottom tool member of a molding system in accordance with an illustrative example.

Turning now to FIG. 5, an illustration of a cross-sectional view of a plurality of removeable inserts and a bottom tool member of a molding system is depicted in accordance with an illustrative example. Plurality of removeable inserts 500 is a physical implementation of plurality of removeable inserts 108 of FIG. 1. In some illustrative examples, plurality of removeable inserts 500 is a subset of plurality of removeable inserts 206 of FIG. 2. In some illustrative examples, removeable insert 300 of FIG. 3 is one of plurality of removeable inserts 500.

Molding system 502 is configured to form a composite structure having trapped volumes. Molding system 502 comprises plurality of removeable inserts 500, bottom tool member 504, and plurality of restraints 506 physically associated with plurality of removeable inserts 500.

Each removeable insert of plurality of removeable inserts 500 comprises a plurality of pieces configured to be disassembled for removal from the composite structure. For example, removeable insert 508 comprises plurality of pieces 510 configured to be disassembled for removal from a composite structure after molding.

Each removeable insert is configured to be placed in contact with bottom tool member 504. Plurality of restraints 506 is physically associated with plurality of removeable inserts 500. Plurality of restraints 506 is configured to restrain plurality of removeable inserts 500 in vertical direction 511 relative to bottom tool member 504.

In this illustrative example, plurality of restraints 506 takes the form of plurality of fasteners 512. Plurality of fasteners 512 extends through bottom tool member 504 and engages a respective hole of each of plurality of removeable inserts 500. For example, fastener 514 extends through bottom tool member 504 and engages hole 516 of base assembly 518 of removeable insert 508.

The illustration of molding system 520 in FIG. 5 is not meant to imply physical or architectural limitations to the manner in which an illustrative example may be implemented. Other components in addition to or in place of the ones illustrated may be used. For example, the shape, size, and quantity of plurality of removeable inserts 500 is only illustrative in FIG. 5. Further, although plurality of removeable inserts 500 is depicted having respective holes for receiving plurality of fasteners 512, in some non-depicted examples, plurality of fasteners 512 extends from respective base assemblies of plurality of removeable inserts 500.

Figure 6:
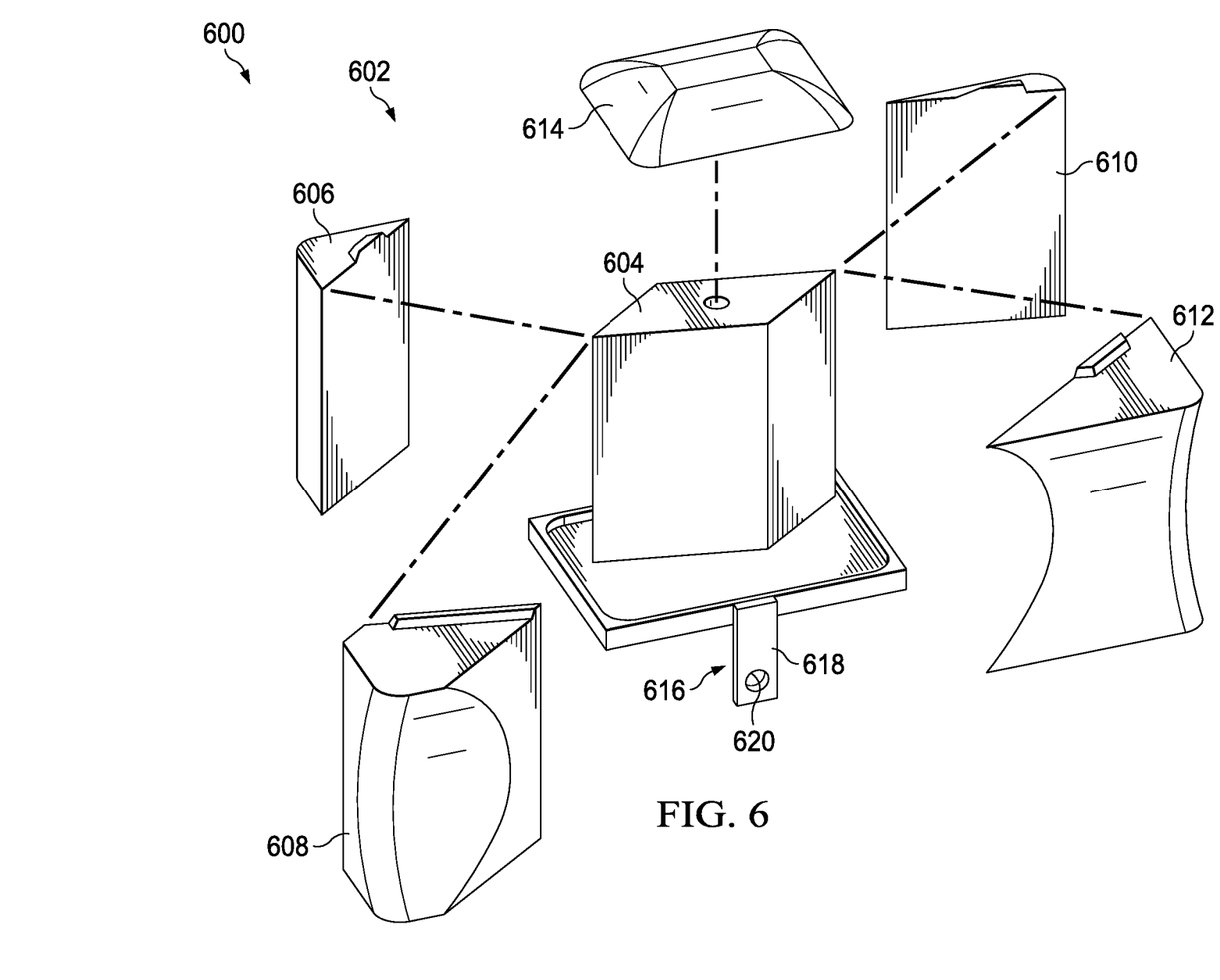
FIG. 6 is an illustration of an exploded view of a removeable insert of a molding system in accordance with an illustrative example.

Turning now to FIG. 6, an illustration of an exploded view of a removeable insert of a molding system is depicted in accordance with an illustrative example. Removeable insert 600 is a physical implementation of removeable insert 114 of FIG. 1. In some illustrative examples, removeable insert 600 is one of plurality of removeable inserts 206.

Removeable insert 600 comprises plurality of pieces 602 configured to be disassembled for removal from a composite structure. Plurality of pieces 602 comprises base assembly 604. Piece 606, piece 608, piece 610, piece 612, and piece 614 are interconnecting. In an assembled configuration (not depicted), piece 606, piece 608, piece 610, and piece 612 are in contact with base assembly 604. Piece 614 acts as a cap when removeable insert 600 is in an assembled configuration (not depicted). In an assembled configuration (not depicted), plurality of pieces 602 of removeable insert 600 is interconnected. In an assembled configuration (not depicted), plurality of pieces 602 of removeable insert 600 has restricted movement relative to each other.

In an assembled configuration (not depicted), piece 606, piece 608, piece 610, and piece 612 are seated in base assembly 604. In an assembled configuration (not depicted), piece 614 is connected to each of piece 606, piece 608, piece 610, and piece 612.

To form a structure using compression molding, removeable insert 600 is installed in a molding system, such as molding system 100 of FIG. 1, in an assembled configuration. After molding a composite structure, such as composite structure 104, using removeable insert 600, removeable insert 600 may be disassembled and removed, piece by piece, from a cavity in the composite structure.

Removeable insert 600 is configured to be restrained against vertical movement relative to a bottom tool member (not depicted). To restrain removeable insert 600 in a vertical direction relative to a bottom tool member, removeable insert 600 has restraint 616. In this illustrative example, restraint 616 takes the form of tang 618 physically associated with removeable insert 600.

As depicted, tang 618 is physically associated with base assembly 604 of removeable insert 600. Tang has hole 620. Hole 620 is configured to interact with a locking plate (not depicted). When the locking plate (not depicted) interacts with hole 620 of tang 618, removeable insert 600 is restrained against movement relative to the bottom tool member (not depicted).

The illustration of removeable insert 600 in FIG. 6 is not meant to imply physical or architectural limitations to the manner in which an illustrative example may be implemented. Removeable insert 600 is only one exemplary insert for illustrative purposes. Removeable insert 600 may include any desirable quantity of pieces and desirable shape of pieces to form a composite structure having a desired shape. Removeable insert 600 may include any desirable quantity of pieces and desirable shape of pieces to enable removal of removeable insert 600 from a cavity of the composite structure after the compression molding operation. Removeable insert 600 is comprised of any desirable material including at least one of a metallic material, a ceramic material, or any other suitable material selected to operate desirably within a compression molding operation. Further, tang 618 may have any desirable size or shape to restrain removeable insert 600 in coordination with a locking plate.

Figure 7:
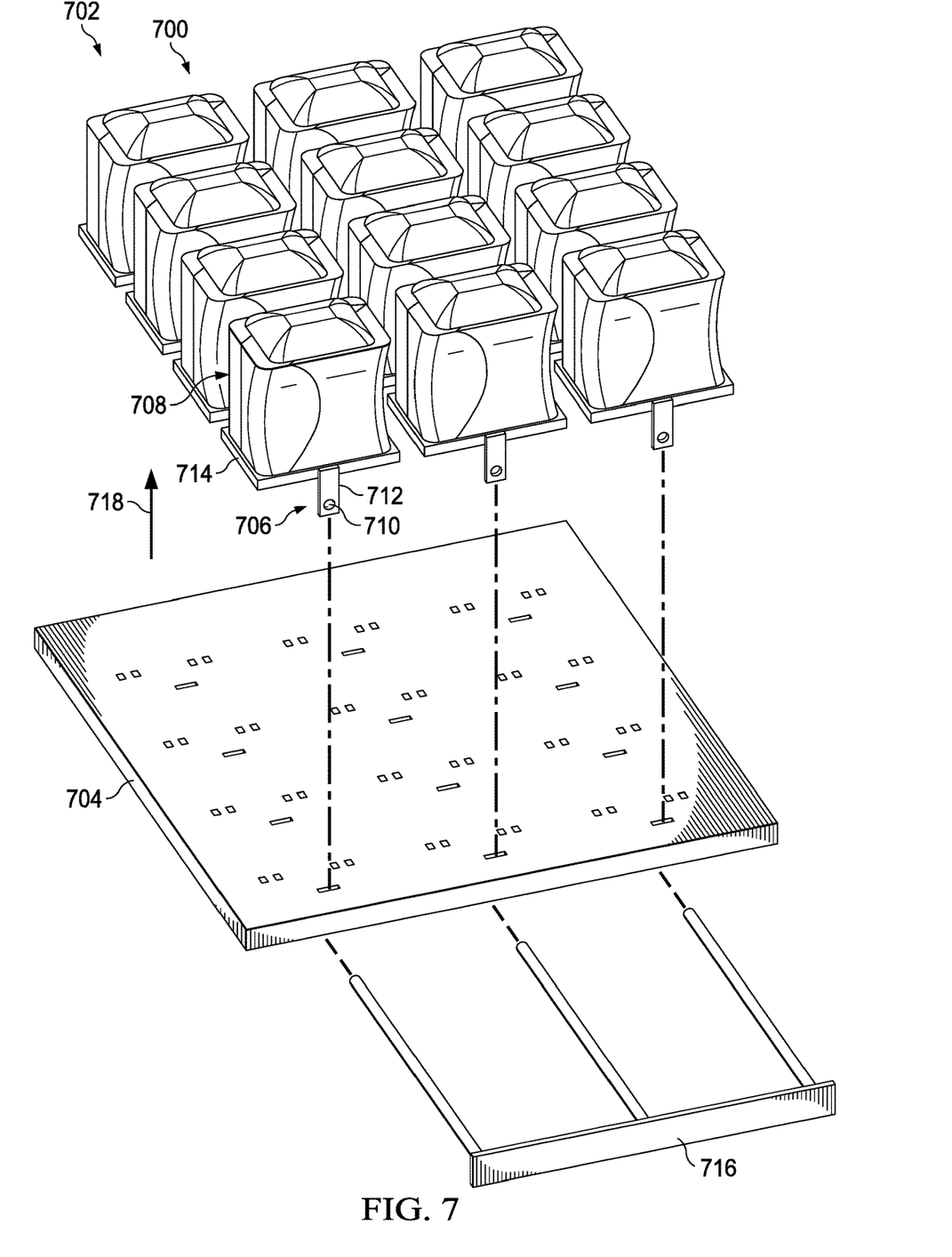
FIG. 7 is an illustration of an exploded view of a plurality of removeable inserts and a bottom tool member of a molding system in accordance with an illustrative example.

Turning now to FIG. 7, an illustration of an exploded view of a plurality of removeable inserts and a bottom tool member of a molding system is depicted in accordance with an illustrative example. Plurality of removeable inserts 700 is a physical implementation of plurality of removeable inserts 108 of FIG. 1. In some illustrative examples, plurality of removeable inserts 700 is a subset of plurality of removeable inserts 206 of FIG. 2. In some illustrative examples, removeable insert 500 of FIG. 5 is one of plurality of removeable inserts 700.

Molding system 702 is configured to form a composite structure having trapped volumes. Molding system 702 comprises plurality of removeable inserts 700 and bottom tool member 704. Each removeable insert of plurality of removeable inserts 700 comprises a plurality of pieces configured to be disassembled for removal from the composite structure (not depicted). Each removeable insert of plurality of removeable inserts 700 is configured to interface with a restraint. Each removeable insert of plurality of removeable inserts 700 has a hole configured to receive a restraint. Each removeable insert is configured to be placed in contact with bottom tool member 704.

As depicted, each removeable insert of plurality of removeable inserts 700 has the hole within a tang extending from a respective base assembly of a respective removeable insert of plurality of removeable inserts 700. As depicted, plurality of removeable inserts 700 has plurality of tangs 706. As depicted, removeable insert 708 of plurality of removeable inserts 700 has hole 710 within tang 712 extending from base assembly 714 of removeable insert 708.

Molding system 702 also comprises locking plate 716. When molding system 702 is assembled, locking plate 716 is in contact with each tang of plurality of removeable inserts 700 to restrain plurality of removeable inserts 700 relative to bottom tool member 704. When molding system is assembled, locking plate 716 is in contact with each tang of plurality of removeable inserts 700 to restrain plurality of removeable inserts 700 in direction 718.

When assembled, each tang of plurality of removeable inserts 700 is inserted into bottom tool member 704. For example, molding system 702 is assembled, tang 712 is inserted into bottom tool member 704.

Figure 8:
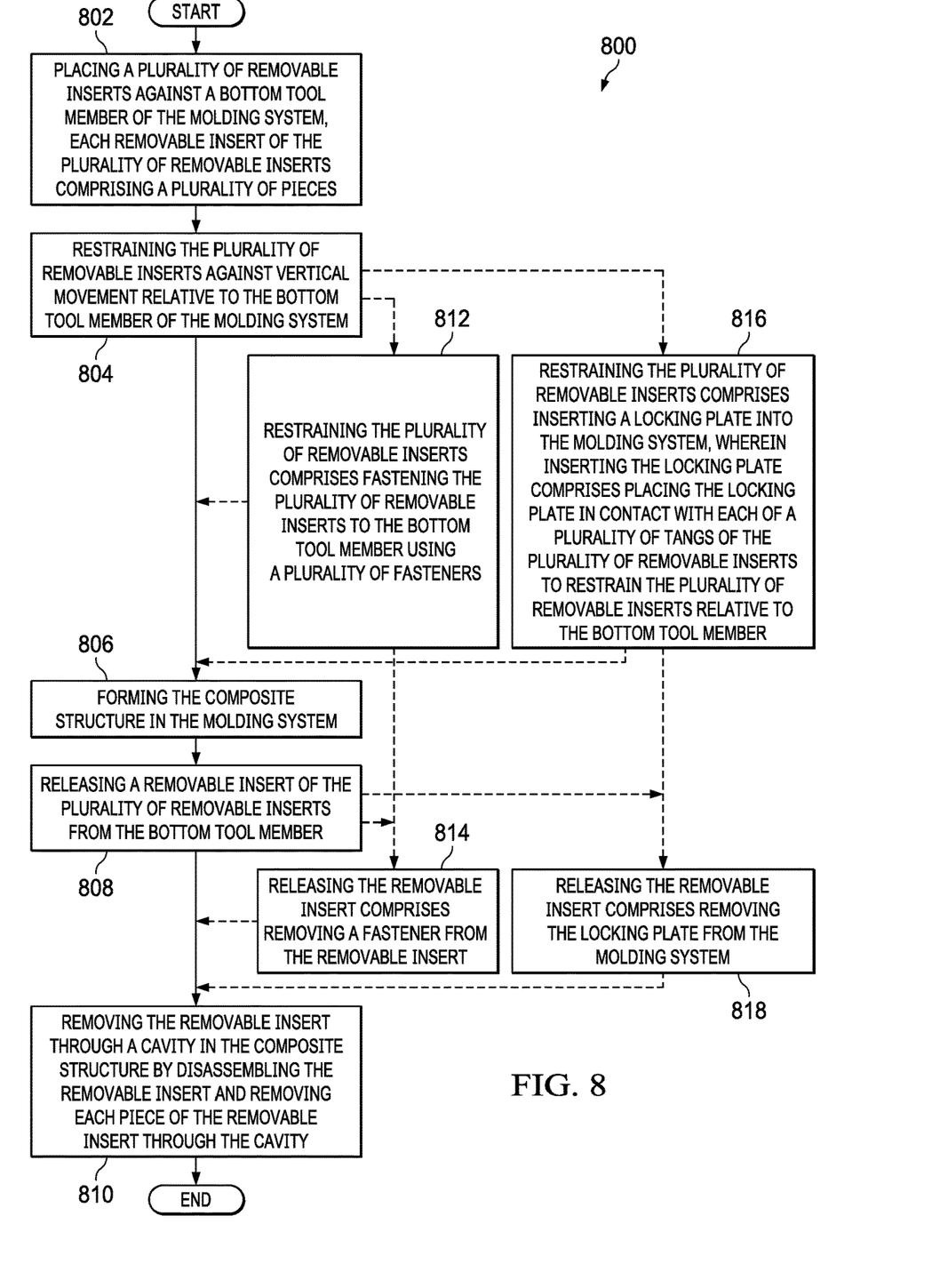
FIG. 8 is an illustration of a flowchart of a method for forming a composite structure using a molding system in accordance with an illustrative example.

Turning now to FIG. 8, an illustration of a flowchart of a method for forming a composite structure using a molding system is depicted in accordance with an illustrative example. Method 800 may be performed using molding system 100 of FIG. 1. Method 800 may be used to form composite structure 104 of FIG. 1. Method 800 may be performed using any of removeable insert 300 of FIG. 3, plurality of removeable inserts 400 of FIG. 4, plurality of removeable inserts 500 of FIG. 5, removeable insert 600 of FIG. 6, or plurality of removeable inserts 700 of FIG. 7.

Method 800 places a plurality of removeable inserts against a bottom tool member of the molding system, each removeable insert of the plurality of removeable inserts comprising a plurality of pieces (operation 802). The plurality of removeable inserts may have any desirable size or shape. In some illustrative examples, each of removeable insert of the plurality of removeable inserts is indexed against bottom tool member. In some illustrative examples, each removeable insert of the plurality of removeable inserts may be indexed as each removeable insert is placed in contact with the bottom tool member. In some illustrative examples, the plurality of removeable inserts is indexed using posts or pins that create an interference fit with indentations. The posts or pins may be associated with either the insert or the bottom tool member. The indentations may be associated with either the insert or the bottom tool member. In some illustrative examples, each insert is associated with at least two posts or indentations.

Method 800 restrains the plurality of removeable inserts against vertical movement relative to the bottom tool member of the molding system (operation 804). In some illustrative examples, the restraint of a removeable insert may be used to index the removeable insert prior to restraining the removeable insert.

For example, a fastener on a base assembly of a removeable insert may be used to index the removeable insert by placing the fastener through a hole in the bottom tool member. The fastener may then be used to restrain the removeable insert against vertical movement relative to the bottom tool member. As another example, a tang on a base assembly of a removeable insert may be used to index the removeable insert by placing the fastener through a hole in the bottom tool member. The tang may then be used to restrain the removeable insert against vertical movement relative to the bottom tool member.

In some illustrative examples, the restraint is used with at least one of a pin or an indentation to index the insert. For example, a tang and a pin may be associated with a base assembly of a removeable insert and used to index the removeable insert.

Method 800 forms the composite structure in the molding system (operation 806). During forming of the composite structure, a composite material is introduced to the molding system. During forming of the composite structure, at least one of pressure or heat is applied to the composite material.

Method 800 releases a removeable insert of the plurality of removeable inserts from the bottom tool member (operation 808). Method 800 removes the removeable insert through a cavity in the composite structure by disassembling the removeable insert and removing each piece of the removeable insert through the cavity (operation 810). Afterwards, method 800 terminates.

In some illustrative examples, restraining the plurality of removeable inserts comprises fastening the plurality of removeable inserts to the bottom tool member using a plurality of fasteners (operation 812). In some illustrative examples, releasing the removeable insert comprises removing a fastener from the removeable insert (operation 814).

In some illustrative examples, restraining the plurality of removeable inserts comprises inserting a locking plate into the molding system, wherein inserting the locking plate comprises placing the locking plate in contact with each of a plurality of tangs of the plurality of removeable inserts to restrain the plurality of removeable inserts relative to the bottom tool member (operation 816). In some illustrative examples, releasing the removeable insert comprises removing the locking plate from the molding system (operation 818).

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 800 are performed. For example, operations 812 through 818 of FIG. 8 are optional.

Figure 9:
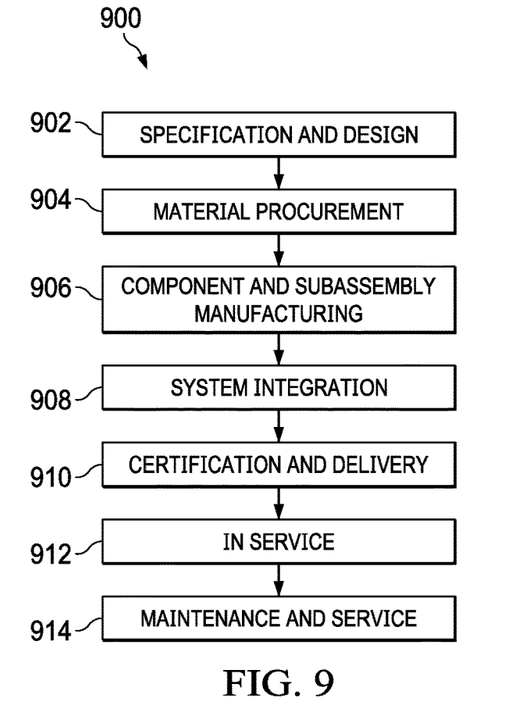
FIG. 9 is an illustration of an aircraft manufacturing and service method in the form of a block diagram in accordance with an illustrative example.
Figure 10:
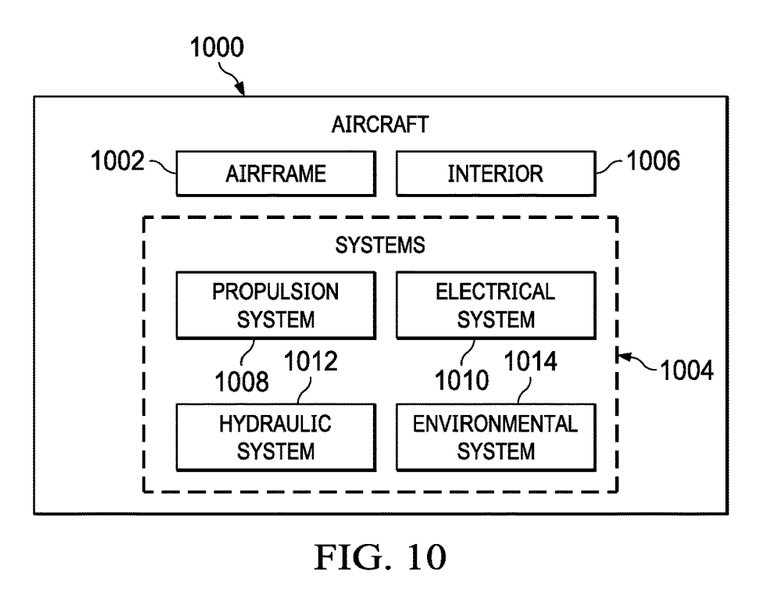
FIG. 10 is an illustration of an aircraft in the form of a block diagram in which an illustrative example may be implemented.

The illustrative examples of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative example. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 10, an illustration of an aircraft is depicted in which an illustrative example may be implemented. In this example, aircraft 1000 is produced by aircraft manufacturing and service method 900 in FIG. 9 and may include airframe 1002 with a plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 900. One or more illustrative examples may be used during component and subassembly manufacturing 906, system integration 908, or maintenance and service 914 of FIG. 9. For example, molding system 100 may be used to form cascade assembly 150 of aircraft 1000, during component and subassembly manufacturing 906. As another example, cascade assembly 150 may be a replacement part used to replace a pre-existing cascade assembly during maintenance and service 914 of FIG. 9.

The illustrative examples present a molding system with a restrained plurality of removeable inserts. The plurality of removeable inserts may also be referred to as mold inserts. The mold inserts within the compression molding system are fixed to ensure no movement of the inserts occur while material flow is in process during compression, clamping and dwell periods.

The plurality of restraints prevents or reduces movement of the plurality of inserts within the compression mold cavity for ensuring consistent wall thicknesses and shape of the final component being molded. The plurality of restraints provides consistent material flow within the compression mold cavity due to reduction of movement of the plurality of inserts during compression molding. In the illustrative examples, the plurality of removeable inserts is secured to the mold tool lower base, as referred to as the bottom tool member.

Securing the plurality of removeable inserts provides for wall thickness consistency within the composite structure. A composite structure formed using a mold system having a restrained plurality of removeable inserts is fully filled, with some flash. After de-flashing, the walls of the composite structure are within tolerance. In some illustrative examples, the thickness of the Cascade vane wall was very close, within 0.002 inch of the expected wall thickness, based on measurements before and after molding.

The illustrative examples provide restrained removeable inserts to prevent or reduce movement of the removeable inserts while material flow is in process during compression, clamping and dwell periods. The plurality of restraints takes any desirable form of physical restraints. In some illustrative examples, the plurality of restraints includes any desirable type of fasteners. In some illustrative examples, the plurality of restraints includes any desirable type of physical restraint in addition to interference fit indexing components.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A molding system configured to form a composite structure that comprises trapped volumes, such that the molding system comprises:
    a ram, a compression chamber, and a bottom tool member;
    a plurality of removeable inserts, such that each removeable insert of the plurality of removeable inserts comprises: respectively, a base assembly that comprises a planar section configured to be held directly against a first side of the bottom tool member, and a plurality of pieces configured to interconnect with the base assembly and be disassembled and removed from the composite structure after it is molded, such that the base assembly comprises a tang configured to extend away from the plurality of pieces, through the bottom tool member away from a side opposite the first side of the bottom tool member; and
    a locking plate configured to slide underneath the side opposite the first side of the bottom tool member and interact with each tang of the plurality of removeable inserts such that the planar section of each base assembly locks against the first side of the bottom tool member.

2. The molding system of claim 1, wherein the each tang comprises a rectangular shape.

3. The molding system of claim 2, wherein each tang comprises a hole therethrough configured to interact with the locking plate.

4. The molding system of claim 2, wherein the plurality of pieces comprises a cap.

5. The molding system of claim 1, wherein each removeable insert of the plurality of removeable inserts comprises a number of indexing components configured to position the removeable insert on the bottom tool member.

6. The molding system of claim 1, wherein the plurality of removeable inserts align in rows and columns on the bottom tool member.

7. The molding system of claim 1, wherein the tang on the base assembly of each of the plurality of removeable inserts is configured to control a thickness of the composite structure between the plurality of removable inserts.

8. The molding system of claim 1, wherein the plurality of pieces of each removeable insert of the plurality of removeable inserts comprises five pieces.

9. The molding system of claim 8, wherein the plurality of pieces further comprises a cap.

10. The molding system of claim 1, wherein the plurality of pieces of a respective removeable insert has restricted movement relative to each other in an assembled configuration of the respective removeable insert of the plurality of removeable inserts.

11. A molding system configured to form a composite structure that comprises trapped volumes, such that the molding system comprises:
    a ram, a compression chamber, and a bottom tool member;
    a plurality of removeable inserts, such that each removeable insert of the plurality of removeable inserts comprises: respectively, a base assembly that comprises a planar section configured to be held directly against a first side of the bottom tool member, and a plurality of pieces configured to interconnect with the base assembly and be disassembled and removed from the composite structure after it is molded into a part of an aircraft, such that the base assembly comprises a tang configured to extend away from the plurality of pieces, through the bottom tool member away from a side opposite the first side of the bottom tool member; and
    a locking plate configured to slide underneath the side opposite the first side of the bottom tool member and interact with each tang of the plurality of removeable inserts such that the planar section of each base assembly locks against the first side of the bottom tool member.

12. The molding system of claim 11, wherein each removeable insert of the plurality of removeable inserts comprises an indentation configured to receive a pin extended from the first side of the tool bottom member.

13. The molding system of claim 12, wherein each tang comprises a hole configured to engage with the locking plate.

14. The molding system of claim 13, wherein the tang comprises a rectangular shape.

15. The molding system of claim 12, wherein each removeable insert of the plurality of removeable inserts comprises, respectively, a number of indexing components configured to position each removeable insert on the bottom tool member.

16. A method of forming a composite structure using a molding system, the method comprising:
    placing a plurality of removeable inserts against a bottom tool member of the molding system comprising a ram and a compression chamber, each removeable insert of the plurality of removeable inserts comprising, respectively, a base assembly comprising a planar section held directly against a first side of the bottom tool member, and a plurality of pieces interconnecting with the base assembly, such that the base assembly comprises a tang configured to extend away from the plurality of pieces, through the bottom tool member away from a side opposite the first side of the bottom tool member;
    restraining the plurality of removeable inserts against vertical movement relative to the bottom tool member of the molding system via sliding a locking plate underneath the side opposite the first side of the bottom tool member and engaging each tang of the plurality of removeable inserts;
    forming the composite structure in the molding system;
    releasing the plurality of removeable inserts from the bottom tool member via removing the locking plate; and
    removing a removeable insert through a cavity in the composite structure by disassembling the removeable insert and removing each piece of the removeable insert through the cavity.

17. The method of claim 16, wherein each tang comprises a rectangular shape.

18. The method of claim 17, wherein the plurality of pieces comprises a cap.

19. The method of claim 16, wherein engaging each tang comprises sliding the locking plate through a respective hole in each tang of the plurality of removeable inserts.

20. The method of claim 19, wherein removing the locking plate comprises withdrawing the locking plate from the respective hole in each tang.

* * * * *